June 3, 1958 — H. RUEGER — 2,837,593
PRIMARY CELL CASE

Filed Nov. 23, 1955 — 2 Sheets-Sheet 1

INVENTOR
HERMAN RUEGER

BY *M. V. Gould*

ATTORNEY

June 3, 1958  H. RUEGER  2,837,593
PRIMARY CELL CASE
Filed Nov. 23, 1955  2 Sheets-Sheet 2

INVENTOR
Herman Rueger
BY *M. V. Gould*
ATTORNEY

United States Patent Office 2,837,593
Patented June 3, 1958

2,837,593

PRIMARY CELL CASE

Herman Rueger, Lancaster Township, Lancaster County, Pa., assignor to Hamilton Watch Company, Lancaster, Pa., a corporation of Pennsylvania Application November 23, 1955, Serial No. 548,660

6 Claims. (Cl. 136—166)

This invention relates to a case for primary cells of the alkaline type.

In alkaline cells using a zinc anode, a mercuric oxide depolarizing cathode and a potassium hydroxide electrolyte, gas is generally generated due to impurities in the materials used, improper storage conditions, or other causes, and this gas builds up to a high pressure within the case, frequently causing cell leakage. Such leaks generally occur at the point of sealing the upper cap to the lower body portion of the case or at a point where an electrode is secured to the case.

Considerable attention has been devoted to this problem and numerous types of more or less successful seals have been utilized. The problem is particularly acute in flat or wafer type cells of small size where seal area is generally limited and where the application of high seal forming pressure is most likely to damage small, fragile cell elements. Cost consideration and the size of the cells involved generally dictate a punch and die sealing technique and generally speaking complex shapes have not been attempted.

According to the present invention it has been found that a highly fluid tight seal may be produced by means of a punch and die seal method if the seal is generally formed beyond the outer periphery of the cell case utilizing concentric circular seal members. Extremely high sealing pressures may be used to form a relatively large area seal and the circular shape provides a particularly rugged cell. The position and shape of the seal prevents the high pressures applied from damaging the cell elements while permitting a high uniformity in cell construction and cell element positioning.

It is accordingly a primary object of the present invention to provide a primary dry cell case which may be more thoroughly and effectively sealed against rupture due to pressure from within.

It is a further object of the present invention to provide a particular type of case structure by means of which the contact of the seal may extend over a generally circular surface through an angle in excess of 180°.

It is a still further object of the present invention to provide on the body portion of the case a rolled rim which will not deform under the sealing pressure when the cap is applied.

It is a further object of the present invention to provide a case formed of a lower section having a straight vertical side and an upper section having a diverging side terminating in a rolled rim, and a cap to be fitted to this rolled rim by having its edges curled under the rim with a downward and radially inward and outward pressure which is directed wholly outside of the interior of the case to prevent any possible damage to the contents of the case during the sealing operation.

It is a further object of the present invention to set forth a method of applying the sealing cap to a battery case so that extremely high sealing pressures may be used without danger of rupturing or deforming any of the components of the battery or creating too much pressure between the elements within the case.

Further objects and advantages of the invention will become apparent upon reference to the following specification and drawings and appended claims wherein:

Figure 1:
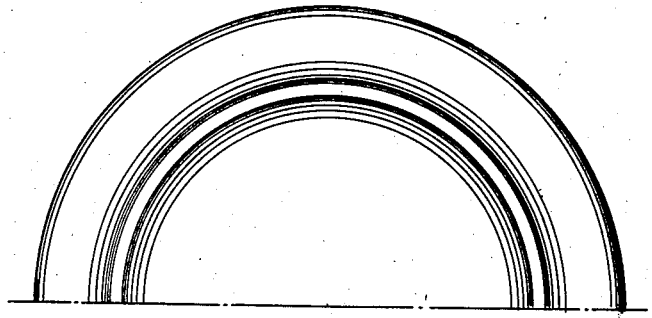
Figure 1 is a plan top view of one-half of a battery cell formed according to the invention.
Figure 2:
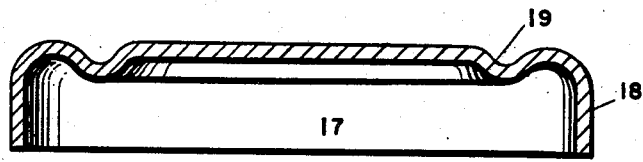
Figure 2 is a vertical cross section of the cap shown in Figure 1.
Figure 3:
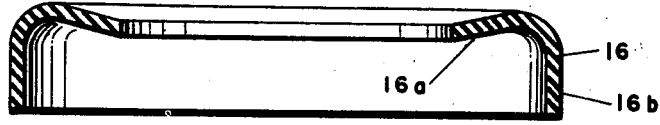
Figure 3 is a vertical cross section of the sealing washer.
Figure 4:
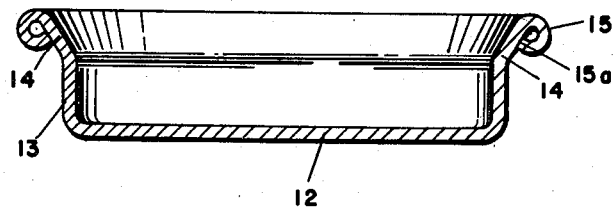
Figure 4 is a vertical cross section of the body portion of the case.

Referring to the figures of the drawings, the body portion of the case is formed with a bottom section 12 having vertical sides 13 and a top section having sides 14 which are flared outwardly at an angle to the vertical and terminate in a rolled rim 15. The rim 15 is rolled through an arc well in excess of 180° and the end 15a of the rim may butt against the flared wall 14 to form a particularly strong bead which, because of the flare in wall 14, presents a large arcuate sealing area. The rim adds strength to the body portion and can receive the sealing pressure of the cap without deformation and without damage to the contents of the cell. Adapted to fit over the outside rim of the body portion is a sealing washer 16 having an inwardly extending portion 16a and a depending portion 16b.

A cap 17 having straight sides 18 and an annular groove 19 formed in the top adjacent the edge, is adapted to fit over the sealing washer 16 and be turned around into sealing engagement with the rolled rim 15. Due to the annular groove 19 and the sloping side 14 of the body portion, the sealing engagement extends from a point 20 to a point 21 (Figure 5), or an arcuate distance of approximately 240°. This provides a seal area well in excess of the amount usually found in cells of this type and provides a case which is effectively sealed against internal pressures as high as 13,000 pounds per square inch.

The sealing operation is carried out on a circular rim which is beyond and wholly outside of the interior of the body portion of the case. This prevents any possibility of rupture of the contents of the case, prevents the different elements from being jammed together, and allows the maintenance of accurate spacing of the different elements within the case.

Figure 5:
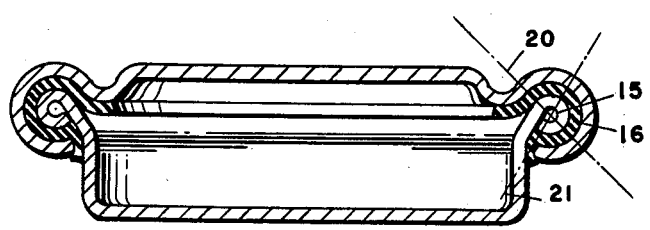
Figure 5 is a vertical cross section of the assembled case.
Figure 6:
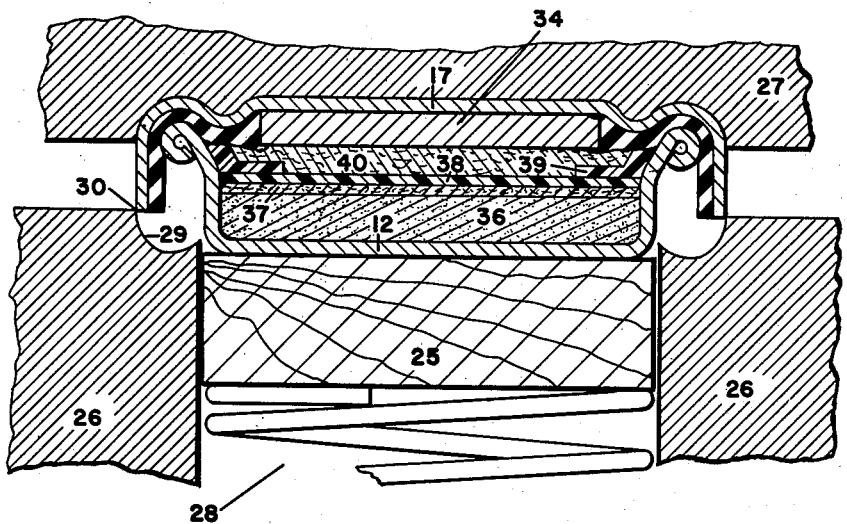
Figure 6 is a cross section of the sealing fixture and battery at the start of the sealing operation.
Figure 7:
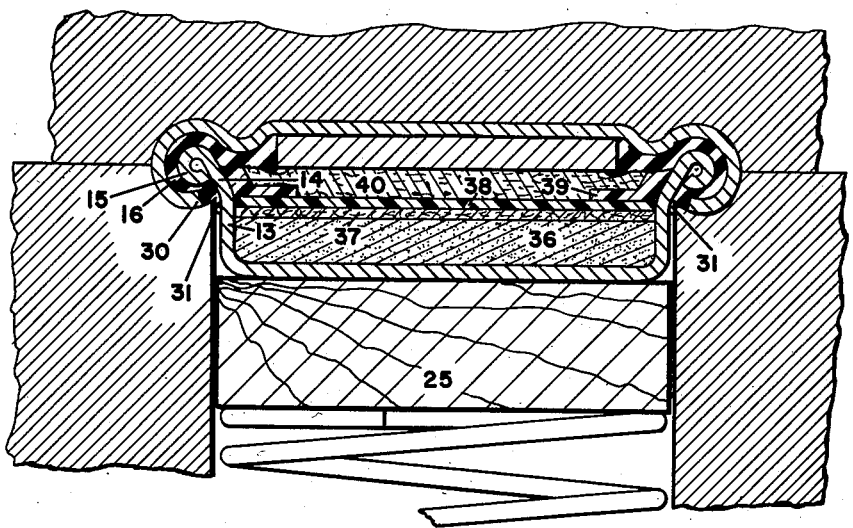
Figure 7 is a cross section similar to Figure 6 showing the sealing operation completed.

Referring particularly to Figures 6 and 7, the battery case 12 is shown resting on a semiresilient member 25 which may be either formed of rubber or may be a wooden plug backed by a spring. The sealing fixture is composed of a bottom die 26 and an upper punch 27. The bottom section 26 is provided with a central hole 28 for the reception of the plug 25 and is larger in diameter than the diameter of the bottom section of the battery case. The central hole 28 in the bottom section 26 is made larger than the diameter of the case 13 to prevent electrical contact between the case and the lower die during the sealing operation. This lower die section is formed with a circular groove 29 adjacent the hole 28. The upper punch section 27 is formed to mate with the upper surface of the cap 17. Downward movement of the punch 27 forces the end 30 of the cap into the groove 29 of the die, the shape of the groove 29 curling the end of the cap 30 into a position around the rim 15, being spaced therefrom by the washer 16. The end 30 of the cap 17 is cut so that it will terminate short of the wall 13 of the lower section of the case, and the end 31 of the sealing washer 16 is preferably forced outward and between the wall 13 and the end 30 of the cap 17 to prevent any possible metallic contact between the cap and the case. It will be seen that, as shown in Figure 5, the seal extends well over 180°. In Figures 6 and 7 a zinc anode 34 is shown attached to the inside of the cap. The case 12 contains a mercuric oxide cathode 36, an electrolyte carrying pad 37, a barrier 38, a hold down washer 39 and a second electrolyte carrying pad 40. It is desirable that a battery be sealed without crushing the mercuric oxide or without in any way disturbing the relative positions of the ingredient.

This method of sealing allows pressure to be exerted by the punch on the cap and extended rim of the case wholly outside of the area within the case. The resilient member 25 permits the entire sealing pressure to be carried on the rim 15 independently of the contents of the battery case. This prevents any posisble chance of jamming the elements into closer relationship than is desired, eliminates the possibility of crushing the mercuric oxide cathode, and prevents rupturing a barrier disc which may be located between the cathode and the anode.

The circular cross section of the rim 15 with the butt joint at 15a provides a strong inner seal surface which lends considerable rigidity to the cell. The washer 16 is not only sealed to this seal surface over an arcuate distance of approximately 240°, but is also sealed against the outer surface of the body portion of the casing by the butt end of the sides 18 of the cap 17.

The invention may be embodied in other specific forms without departing from the spirit or essential characteristics thereof. The present embodiments are therefore to be considered in all respects as illustrative and not resrtictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A housing for a primary cell comprising a cup-like casing having a cylindrical closed bottom and an open end, said open end terminating in an outwardly rolled rim having a continuously arcuate cross section which is located radially outward of the cylindrical portion of the case, a cap secured to said case over the open end thereof and having an annular groove of a smaller diameter than the innermost diameter of said rolled rim, and a washer between said rim and said cap, the edge of said cap outward of said rim being rolled about said rim to have a continuously arcuate cross section extending from said rim to the edge of said cap, said washer being held between said arcuate cross sections of said rim and cap over an arcuate cross sectional distance in excess of 180° to form a liquid and gas tight seal.

2. A housing as set out in claim 1 wherein the casing is flared outwardly adjacent the rolled rim so that the entire arcuate cross section of said rim is radially outward of the cylindrical portion of said casing.

3. A housing as set out in claim 2 wherein the edge of said rim abuts said flared portion of said casing.

4. A housing as set out in claim 3 wherein said rim and the curled edge of said cap are continuously arcuate through approximately 240°.

5. A housing as set out in claim 4 wherein the edge of the curled portion of said cap terminates adjacent said flared portion, said washer extending between said edge and flared portion.

6. A method of sealing a cap to a cup-like primary battery case having a cylindrical portion with a curled rim at the open end thereof lying radially outward of the cylindrical portion, comprising the steps of; placing said case in a lower die completely out of contact therewith, resiliently supporting said case in said lower die out of electrical contact therewith, placing an insulating washer over said rim and a cap having a depending peripheral skirt over said case and insulating washer, and curling said skirt about said washer and rim by means of a descending upper die which cooperates with said lower die to exert a pressure on said skirt, washer and rim radially outward of said cylindrical portion of said case, while said case is maintained continuously out of contact with said lower die.

References Cited in the file of this patent
UNITED STATES PATENTS

| | | |
|---|---|---|
| 1,996,982 | Sprague et al. | Apr. 9, 1935 |
| 2,174,437 | Collins | Sept. 26, 1939 |
| 2,262,836 | Deibel | Nov. 18, 1941 |
| 2,580,664 | Drummond | Jan. 1, 1952 |
| 2,617,863 | Stinson | Nov. 11, 1952 |